Jan. 30, 1923.

F. MÜLLER.
RELIEVING MACHINE.
ORIGINAL FILED SEPT. 11, 1919.

Inventor
Friederich Müller
By S. Jay Teller
Attorney.

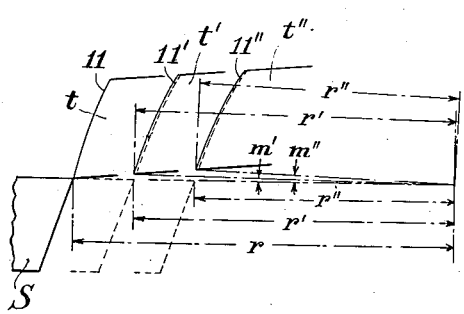
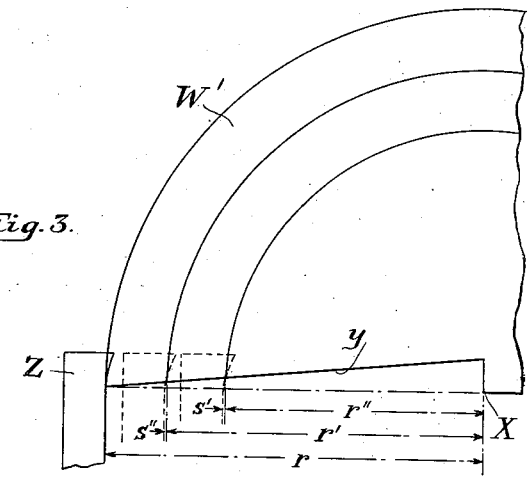
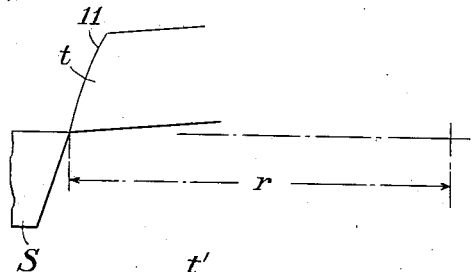
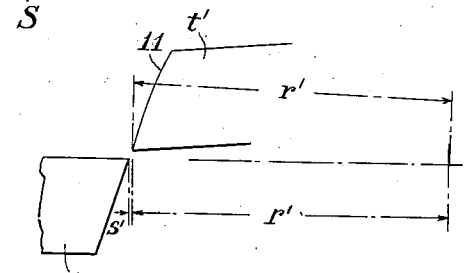
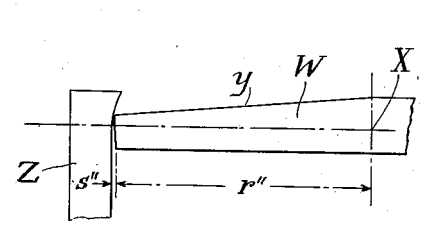

Patented Jan. 30, 1923.

1,443,637

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

RELIEVING MACHINE.

Application filed September 11, 1919, Serial No. 323,114. Renewed December 2, 1922.

*To all whom it may concern:*

Be it known that I, FRIEDERICH MÜLLER, a citizen of the United States, residing at Hartford, in the county of Hartford and State of Connecticut, have invented certain new and useful Improvements in Relieving Machines, of which the following is a specification.

The invention relates to a relieving machine similar to that shown in my Patent No. 1,429,617. The object of the invention is to provide a machine of this type adapted for carrying out the method set forth in my copending application for methods of making milling cutters, Serial No. 323,113, filed on even date herewith.

In the accompanying drawings I have shown a machine embodying the invention, the illustration being somewhat diagrammatic for the sake of simplicity. As concerns most of the details of the machine I prefer the construction shown in my Patent No. 1,429,617.

Of the drawings:

Fig. 3 is a diagrammatic view illustrating the operation of the machine and showing the supplemental relative movement between the blank and the tool, that is required for undercut faces on the cutter. The three fragmentary tooth sections can be considered as taken respectively along the lines 4—4, 5—5 and 6—6 of Fig. 1.

Figure 1:
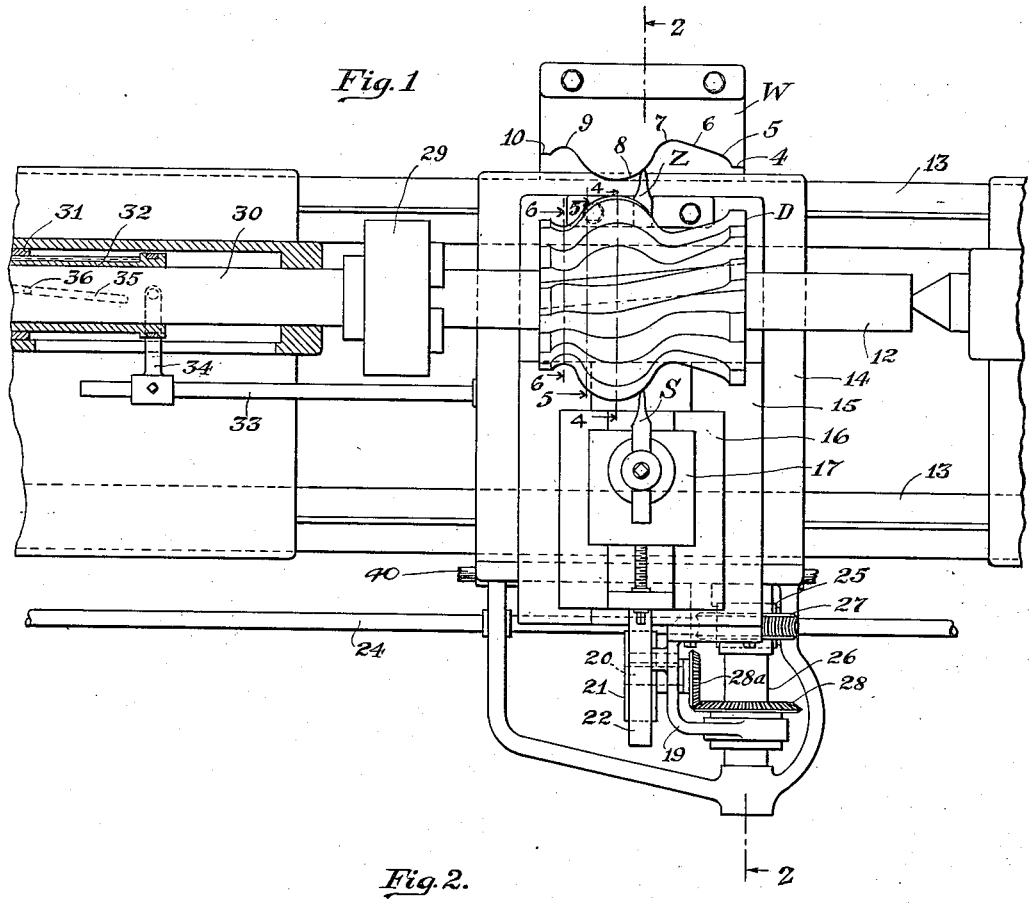
Fig. 1 is a diagrammatic plan view of a machine embodying the invention.
Figure 2:
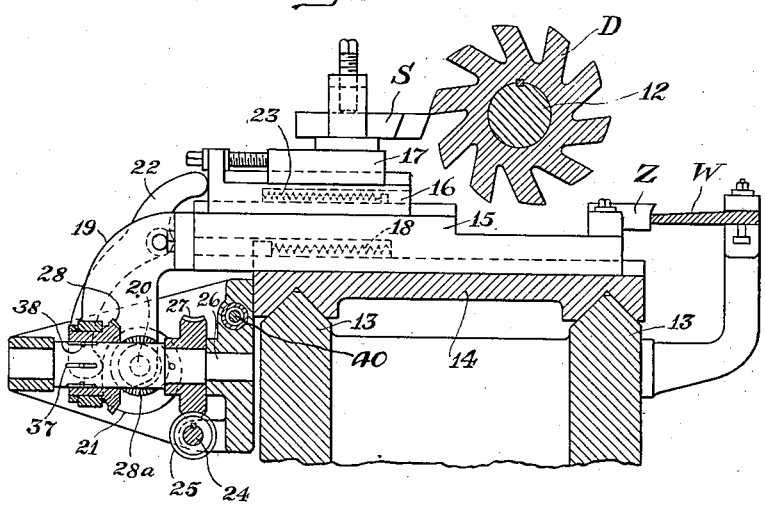
Fig. 2 is a sectional view taken along the line 2—2 of Fig. 1.

Figs. 4, 5 and 6 are daigrammatic views similar to Fig. 3 illustrating the blank and the tool relatively adjusted for the respective positions represented by the lines 4—4, 5—5 and 6—6.

Referring to the drawings, 12 is a mandrel upon which is carried a cutter blank D. This blank may have its cutting faces non-radially arranged or undercut, and if desired the faces may also be helicoidal, as shown. Suitable means are provided for supporting and rotating the mandrel. Longitudinally movable along ways 13, 13 is a carriage 14 upon which is mounted a transversely movable slide 15. Carried by the slide 15 is an independently movable transverse slide 16 which carries a cutting tool S, there preferably being an intermediate slide 17 by means of which preliminary adjustments may be effected. Secured to the slide 15 is a former pin Z the shape of which, in horizontal cross sectional outline, corresponds to that of the tool S, preferably being exactly the same. For a purpose to be described, the upper part of the former pin is curved rearward as shown. Secured to the main frame of the machine is a former W of special shape and having a contour 4—10 which is exactly the same as the desired effective contour of the finished cutter. A suitable shaft 40 is provided for effecting longitudinal movement of the carriage 14.

A spring 18 is provided for pressing the slide 15 toward the rear and thus holding the former pin Z always in engagement with the former W. It will be seen that when the carriage 14 is moved longitudinally the slide 15 will be caused to move transversely under the guidance of the former, the tool S thus being caused to follow an outline which is exactly the same as that of the former W, except for a small variation due to the peculiar shapes of the pin Z and the former W, as will presently be explained.

Mounted on the carriage 14 and on the transversely movable slide 15 is a suitable mechanism for reciprocating the slide 16 to effect the relieving movements of the tool. Rotatably mounted in a bearing on a bracket 19 carried by the slide 15 is a longitudinal shaft 20 which carries a cam 21. Pivoted to the slide 15 is a lever 22 which at its lower end engages the cam 21 and which at its upper end engages the slide 16. A spring 23 serves to hold the slide 16 in engagement with the lever. It will be seen that when the shaft 20 and the cam 21 are rotated the lever 22 will be oscillated, thus reciprocating the slide 16 and the tool S. For rotating the shaft 20 and the cam 21 there is provided a longitudinal shaft 24 which is rotated in any suitable way. Splined on the shaft is a worm 25 which is movable longitudinally with the carriage 14. Mounted on the carriage is a transverse horizontal shaft 26 carrying a worm wheel 27 which meshes with the worm 25. Slidably mounted on the shaft 26 is a bevel gear 28 which meshes with a bevel gear 28ª on the shaft 20. The bevel gear 28 is engaged by the bracket 19 and is thus held in mesh with the bevel gear 28ª as the slide 15 and the parts connected therewith move transversely. The shaft 24 is driven in proper timed relationship with the spindle so that normally, for any given position of the carriage, the cam 21 is given as many complete revolutions for each revolution of the blank as the blank has teeth.

In order that the relieving movements of the tool S may be varied in accordance with helicoidal cutting faces on the blank, I preferably provide means for supplementally rotating the blank in proportion to the longitudinal movement of the tool. As illustrated, the mandrel 12 is engaged by a chuck 29 on a spindle 30. Power for rotating the spindle is supplied through a sleeve 31 which has splined engagement with a smaller sleeve 32. A rod 33 and a forked lever 34 are provided for causing the sleeve 32 to move longitudinally with the carriage 14. The spindle 30 is fixed against longitudinal movement and extends into the sleeve 32. The sleeve 32 is provided with a helical groove 35 having the same longitudinal pitch as the helicoidal cutting faces of the blank. A pin 36 on the spindle 30 projects into the groove 35, thus transmitting power from the sleeve 32 to the spindle. It will be seen that the construction permits the spindle to be driven by means of the sleeve 31, but that the spindle is supplementally rotated in proportion to the longitudinal movement of the carriage and the cutting tool. This supplemental movement is just sufficient to enable the tool to properly engage the helicoidal teeth.

In order that the operation of the machine may be more fully understood, reference should be had to the diagrammatic Figs. 3 to 6. In Fig. 3 $t$ may be considered to be a fragmentary sectional view taken at the line 4—4 of Fig. 1 of a cutter D having undercut faces, the radius of the cutter at this position being $r$. Under the control of the former and the former pin, the cutting tool S is at a distance $r$ from the blank axis and is in position to engage the point of the tooth shown and cut the proper relief line 11 thereon. A tooth section taken at the line 5—5 of Fig. 1 is shown at $t'$, the radius at this position being $r'$. For this radius $r'$, without special provision being made, the tool S would be in the position indicated by dotted lines at the distance $r'$ from the blank axis. However, by reason of the inclined cutting face on the blank, the blank tooth would not be in engagement with the tool but would be separated therefrom by the angle $m'$. The tool, however, would immediately start its inward relieving movement notwithstanding the fact that the blank tooth has not yet reached it, and the result would be the cutting of an incorrect relief line 11'. A tooth section taken at the line 6—6 of Fig. 1 is shown at $t''$, the radius at this position being $r''$. For this still smaller radius $r''$, the result would be similar to that last described except that the point of the tooth would be separated from the tool by a greater angle $m''$, with the result that the incorrect relief line 11'' would be further from the correct relief line 11. In order to avoid the errors which would occur, as shown in Fig. 3, the machine serves to vary the position or the limits of the relieving movements of the tool.

As shown diagrammatically in Figs. 3 to 6, there is provided a special former W or W'. This former W or W' instead of being provided with a vertical guide surface, is provided with a surface of revolution constructed about a center $x$ and having the desired contour at any axial plane. The surface of revolution is such that the several radii thereof are the same as the corresponding radii of the cutter D to be formed. As shown in Fig. 3, the former W' is provided with a non-radial or undercut surface $y$ which intersects the surface of revolution and which is at the same angle as the undercut tooth faces of the cutter D. Cooperating with the former W' is a former pin Z of special form. As has been before stated, the pin Z has the same cross-sectional shape as the tool S, but the former pin is curved rearward at points above the level of the center $x$ of the former.

A former such as W' illustrated diagrammatically in Fig. 3 would not be entirely practical for the reason that the upper part of the former pin would interfere with the former at places above the inclined surface $y$. A simpler and more practical former W is shown in Figs. 4 to 6. It will be seen that the former W is the same in principle as the former W' but that the body thereof is below the surface $y$ instead of above it. This eliminates any interference with the curved part of the former pin Z.

For the tooth at $t$, as shown in Fig. 4, the tool is at the radius $r$. For this maximum radius no variation in timing is required. For the tooth at $t'$, as shown in Fig. 5, the tool S, instead of being allowed to take a position at the radius $r'$, is caused to take a position at a radius which is greater by the distance $s'$. The distance $s'$ is such that the inward relieving movement of the tool, which starts immediately, will enable the tool to properly engage the toth section $t'$ and properly cut the desired relief line 11 thereon. The tool S is held at the increased radius $r'+s'$ because of the peculiarly curved shape of the former pin Z at its upper part. The former pin engages the edge of the former at a point along the inclined surface $y$, the point of engagement being at a higher elevation because of the inclination. The curvature is such that the vertical part of the pin is held at a distance $r'+s'$ from the center $x$ of the former.

Similarly, at the radius $r''$ for the tooth at $t''$, the tool S, instead of being allowed to take a position at the radius $r''$ from the center, is caused to take a position at a radius which is greater by the distance $s''$. The distance $s''$ is such that the inward relieving movement of the tool which starts immediately, will enable the tool to engage the tooth section $t''$ and properly cut the desired relief line 11 thereon. The increased radius $r''+s''$ is obtained by reason of the aforesaid curvature of the upper part of the former pin Z. This curved part of the pin engages the former at another point along the inclined surface $y$, this point being nearer the center and therefore at a higher elevation.

It will be seen that, when the cutting faces are helicoidal as well as undercut, two independent variations are effected in the relation between the relieving movements of the tool and the rotative movement of the blank. One of these variations is dependent upon the longitudinal movements of the tool along the blank and the other of the variations is dependent upon the inward or outward movement of the tool whereby the blank is cut with different diameters. Preferably, as already stated, the first said variation is effected by changing the rotative movement of the blank and the second variation is effected by changing the position or limits of the relieving movements of the tool.

What I claim is:

1. A relieving machine comprising in combination, a rotatable blank-carrying spindle, a cutting tool, mechanism for effecting relative feeding movement between the tool and the blank longitudinally of the latter, mechanism for moving the tool inward or outward during the feeding movement to cut the blank with different diameters, mechanism for effecting relieving movements of the tool in timed relation to the blank rotation, and means comprising a former and a former pin for changing the limits of the relieving movements of the tool in conformity with non-radial tooth faces on the blank.

2. A relieving machine comprising in combination, a rotatable blank-carrying spindle, a cutting tool, mechanism for effecting relative feeding movement between the tool and the blank longitudinally of the latter, mechanism for effecting relieving movements of the tool in timed relation to the blank rotation, and mechanism including a former and former pin for causing the tool to move inward or outward during the feeding movement to cut the blank with a predetermined contour differing from a straight line, the said former being provided with a surface of revolution having the said predetermined contour and having the same radii as the cutter to be formed from the blank and provided with a non-radial surface intersecting the surface of revolution, and the said former pin having the same horizontal cross-sectional shape as the cutting tool but being curved rearward at points above the level of the center of the former.

3. A relieving machine comprising in combination, a rotatable blank-carrying spindle, a cutting tool, mechanism for effecting relative feeding movement between the tool and the blank longitudinally of the latter, mechanism for moving the tool inward or outward during the feeding movement to cut the blank with different diameters, mechanism for effecting relieving movements of the tool in timed relation to the blank rotation, means for varying the relation between the relieving movements of the tool and the rotative movement of the blank in conformity with helical teeth on the blank, and means comprising a former and a former pin for changing the limits of the relieving movements of the tool in conformity with non-radial tooth faces on the blank.

4. A relieving machine comprising in combination, a rotatable blank-carrying spindle, a cutting tool, mechanism for effecting relative feeding movement between the tool and the blank longitudinally of the latter, mechanism for moving the tool inward or outward during the feeding movement to cut the blank with different diameters, mechanism for effecting relieving movements of the tool in timed relation to the blank rotation, mechanism dependent upon the feeding movement for varying the rotative movement of the blank in conformity with helical teeth on the blank, and mechanism comprising a former and a former pin dependent on the inward or outward movements of the tool for changing the limits of the relieving movements thereof in conformity with non-radial tooth faces on the blank.

5. In a relieving machine for operating on a cutter blank having teeth provided with non-radially arranged cutting faces, the combination comprising a cutting tool, means for effecting feeding movements between the tool and the blank, means for effecting relieving movements, and means comprising a pin and a former for guiding the cutting tool to cut a predetermined contour and for compensating for the non-radial cutting faces on the teeth.

6. In a relieving machine for operating on a cutter blank having helical teeth provided with non-radially arranged cutting faces, the combination comprising a cutting tool, means for effecting longitudinal feeding movements between the tool and the blank, means for varying the transverse position of the tool relative to the blank to permit the longitudinal feeding operation, means for effecting relieving movements, and means comprising a pin and a former for guiding the cutting tool to cut a predetermined contour and for compensating for the non-radial cutting faces on the teeth.

7. In a relieving machine for operating on a cutter blank having teeth provided with non-radially arranged cutting faces, the combination comprising a cutting tool, means for effecting feeding movements between the tool and the blank, means comprising a pin and a former for guiding the cutting tool to cut a predetermined contour, and means for varying the movements of the cutting tool to relieve the teeth on the cutter, said pin and former also serving to compensate for the non-radial cutting faces on the teeth.

8. In a relieving machine for operating on a cutter blank having helical teeth provided with non-radially arranged cutting faces, the combination comprising a cutting tool, means for effecting longitudinal feeding movements between said tool and the blank, means comprising a pin and a former for guiding the tool to cut a predetermined non-rectilinear contour, and means for varying the movements of the cutting tool to relieve the teeth on the cutter, said pin and the former being so formed as to compensate for the non-radial cutting faces on the teeth.

9. In a relieving machine for operating on a cutter blank having helical teeth provided with non-radially arranged cutting faces, the combination comprising a cutting tool, means for effecting intermittent longitudinal feeding movements between said tool and the blank, means for withdrawing the tool from engagement with the blank prior to each feeding movement and for restoring the tool into operative position relative to the blank, means comprising a pin and a former for guiding the tool to cut a predetermined contour, and means for effecting relieving movements of the tool in conformity with the helical teeth on the blank, said pin and the former being so formed as to compensate for the non-radial cutting faces on the teeth.

10. In a relieving machine for operating on a cutter blank having teeth provided with non-radially arranged cutting faces, the combination comprising a cutting tool, means for effecting intermittent longitudinal feeding movements between the tool and the blank, means for withdrawing the tool from engagement with the blank prior to each feeding movement and for restoring the tool into operative position relatively to the blank after each feeding movement, means for effecting relieving movements, and a pin and a former member for guiding said tool to cut a predetermined non-rectilinear contour, said pin and former being so constructed as to compensate for the non-radial cutting faces on the teeth.

11. In a relieving machine, the combination comprising a rotatable blank-carrying spindle, a cutting tool, means for effecting relative feeding movement between the tool and the blank longitudinally of the latter, means comprising a pin and former for moving the tool inward or outward during the feeding movement to cut the blank with different diameters, and means for effecting relieving movements of the tool in timed relation to the blank rotation, said pin and said former being constructed to change the limits of the relieving movements of the tool in conformity with the non-radial tooth faces on the blank.

12. In a relieving machine, the combination comprising a rotatable blank-carrying spindle, a cutting tool, means for effecting relative feeding movements between the tool and the blank longitudinally of the latter, means comprising a pin and former for moving the tool inward and outward during the feeding movement to cut the blank with different diameters, means for effecting relieving movements of the tool in timed relation to the blank rotation, and means for varying the relation between the relieving movements of the tool and the rotative movement of the blank in conformity with helical teeth on the blank, said pin and the former being constructed to change the limits of the relieving movements of the tool in conformity with the non-radial tooth faces on the blank.

In testimony whereof, I hereto affix my signature.

FRIEDERICH MÜLLER.